(12) United States Patent
Jueptner

(10) Patent No.: US 8,242,231 B2
(45) Date of Patent: Aug. 14, 2012

(54) METHOD FOR RECYCLING AMINE CATALYST IN INTERFACIAL POLYCARBONATE MANUFACTURING PROCESS

(75) Inventor: Guenter A. Jueptner, Hammah (DE)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 13/130,010

(22) PCT Filed: Nov. 16, 2009

(86) PCT No.: PCT/US2009/064521
§ 371 (c)(1),
(2), (4) Date: May 18, 2011

(87) PCT Pub. No.: WO2010/059544
PCT Pub. Date: May 27, 2010

(65) Prior Publication Data
US 2011/0224389 A1    Sep. 15, 2011

Related U.S. Application Data

(60) Provisional application No. 61/117,308, filed on Nov. 24, 2008.

(51) Int. Cl.
*C08G 64/00* (2006.01)
*C08G 63/02* (2006.01)

(52) U.S. Cl. ............... 528/196; 526/69; 528/198
(58) Field of Classification Search ............ 526/69; 528/196, 198
See application file for complete search history.

(56) References Cited

U.S. PATENT DOCUMENTS
5,200,496 A * 4/1993 Munjal et al. ............ 528/198

FOREIGN PATENT DOCUMENTS
DE  3644477     * 7/1988
JP  06-329782    11/1994
JP  06329782    * 11/1994

OTHER PUBLICATIONS

International Search Report for PCT/US2009/064521 dated Jan. 22, 2010.

* cited by examiner

*Primary Examiner* — Terressa Boykin
(74) *Attorney, Agent, or Firm* — Brinks Hofer Gilson & Lione

(57) ABSTRACT

The present invention relates to an improved process for recycling a coupling catalyst, preferably an amine catalyst in an interfacial polycarbonate manufacturing process. Specifically, the amine catalyst is recycled in an acidic wash water solution.

8 Claims, 2 Drawing Sheets

METHOD FOR RECYCLING AMINE CATALYST IN INTERFACIAL POLYCARBONATE MANUFACTURING PROCESS

CROSS REFERENCE STATEMENT

This application is the National Stage of International Application No. PCT/US2009/064521, filed Nov. 16, 2009, which claims the benefit of U.S. Provisional Application No. 61/117,308, filed Nov. 24, 2008.

FIELD OF THE INVENTION

The present invention relates to an improved process for recycling amine catalyst in an interfacial polycarbonate manufacturing process. Specifically, the amine catalyst is recycled in an acidic aqueous solution.

BACKGROUND OF THE INVENTION

In the practice of interfacial polymerization to produce polycarbonate, a mixture of bisphenol and a phenolic chain-terminator is phosgenated under interfacial reaction conditions in the presence of an organic solvent. The bisphenol is present as an alkali metal salt in an aqueous phase and the phosgene is dissolved in the organic phase. The chain-growing-reaction is strongly accelerated by a coupling catalyst, such as a tertiary amine. The chain-growing reaction is finished after all of the reactive end-groups, e.g., chloroformate end-groups, have reacted.

After the polymerization step is completed, the organic phase comprising the polycarbonate resin is separated from the aqueous phase. Typically, the amine catalyst is removed from the organic phase comprising the polycarbonate resin by extraction with an aqueous acid such as dilute hydrochloric acid; wherein the acidic wash water comprises the amine catalyst as the amine hydrochloride.

Failure to recover the amine catalyst from the dilute aqueous wash water is undesirable from both an environmental and economic perspective. Several multi-step methods to recover the amine catalyst have been reported. FIG. 1 illustrates, in the form of a flow chart, a conventional method of recovering amine catalysts in interfacial polycarbonate manufacturing processes. U.S. Pat. No. 5,759,406 discloses a method to recover salts of amine catalysts by adsorbing said compounds on an adsorbent resin thus freeing it from other ionic species then washing the adsorbed compounds free by means of a second aqueous solution. However, U.S. Pat. No. 5,759,406 is silent as to how to recover the free amine catalyst from the second aqueous wash. JP 2002-356549 and JP 2001-164033 disclose a two-step method which consists of (1) neutralizing the acidic wash comprising the salt of the amine catalyst then (2) employing an expensive and energy intensive steam distillation step to recover the amine catalyst from the aqueous solution. JP 2001-329059 discloses two methods to recover the amine catalyst. A first method is a two-step method consisting of (1) neutralizing the acidic wash comprising the salt of the amine catalyst and (2) extracting the resulting neutralized aqueous solution containing the amine catalyst with an organic solvent, then recycling the organic solution comprising the amine catalyst back into the interfacial polycarbonate manufacturing process. Alternatively, the second method is a three-step method wherein (1) the acidic wash is neutralized forming an aqueous solution comprising the amine catalyst, (2) extracting the amine catalyst from the neutralized aqueous solution, then (3) separating the organic solvent from the amine catalyst by distillation. However, both methods have demonstrated draw backs. In the two-step method, a known side reaction is the reaction of the amine catalyst with the organic solvent, such as a chlorinated hydrocarbon, to form quaternary ammonium chlorides. When recycled back into the polymerization process even trace amounts of quaternary ammonium chlorides cause thermal and hydrolytic instability causing, among other things, increased color and/or haze, a high content of free bisphenol and phenolic hydroxyl groups, molecular weight degradation and/or lowered viscosity in the polycarbonate resin. It is well known that such quaternary ammonium salts are difficult to completely remove from the polycarbonate solution, thus contaminating the finished polycarbonate and causing said disadvantages. While the three-step method avoids the potential for forming quaternary ammonium chlorides, it does require an additional, expensive and energy intensive distillation process.

Therefore, there is a continuing need for an improved process to recycle amine catalysts in interfacial polycarbonate manufacturing processes which provides for (1) a simpler, more effective and cost effective recovery system of reusable amine catalyst minimizing potential loss to the environment and the formation of quaternary ammonium salts and (2) a polycarbonate resin with improved stability and lower color and/or haze.

SUMMARY OF THE INVENTION

In a first embodiment, the present invention is a method for recycling a coupling catalyst, preferably an amine catalyst in an acidic aqueous solution in an interfacial polycarbonate manufacturing process.

In a second embodiment, the present invention is an improved method for preparing polycarbonate resin from a dihydric phenol, a carbonate precursor, and a monophenolic chain terminator using a coupling catalyst by an interfacial, polycondensation reaction comprising the steps of:
   (a) reacting the carbonate precursor and the dihydric phenol using a two-phase reaction mixture to form carbonate oligomers; the reaction mixture comprising an aqueous, alkaline phase and an immiscible organic phase, with the carbonate precursor being dissolved in an organic phase and a salt of the dihydric phenol and a salt of the monophenolic chain terminator dissolved in the aqueous phase;
   (b) subsequently polymerizing the carbonate oligomers in the presence of a coupling catalyst to form a polycarbonate resin;
   (c) separating the aqueous and organic phases; wherein the organic phase comprises the coupling catalyst and polycarbonate resin;
   (d) treating the separated organic phase with an acidic wash water solution to remove amine coupling agent by forming a salt of the coupling catalyst which is soluble in the acidic wash water solution;
   (e) recovering the polycarbonate resin;
   wherein the improvement comprises
   (i) recycling the acidic wash water solution comprising the salt of the coupling catalyst (d) back into the polymerization step (b).

In a third embodiment of the present hereinabove described invention, further treating the acidic wash water solution comprising the salt of the coupling catalyst with a basic material, preferably a caustic solution, to adjust the solution pH to at least 12 producing an alkaline wash water solution comprising the coupling catalyst then recycling said alkaline wash water solution comprising the coupling catalyst back into the polymerization step (b).

In a preferred embodiment of the present invention, the dihydric phenol is bisphenol-A; the carbonate precursor is phosgene; the monophenolic chain terminator is phenol, para-t-butyl phenol, p-cumyl phenol, or para-t-octyl phenol; and the amine coupling catalyst is a tertiary amine, more preferably triethyl amine.

In another embodiment of the present invention, the process further comprises a branching agent providing a branched polycarbonate resin.

Another embodiment of the present invention is a polycarbonate resin or a branched polycarbonate resin produced by the process(es) described hereinabove.

DETAILED DESCRIPTION OF THE INVENTION

The present invention is a method for recycling the coupling catalyst, preferably an amine coupling catalyst from the acidic aqueous wash water used to treat the organic phase in an interfacial, polycarbonate manufacturing process.

Figure 1:
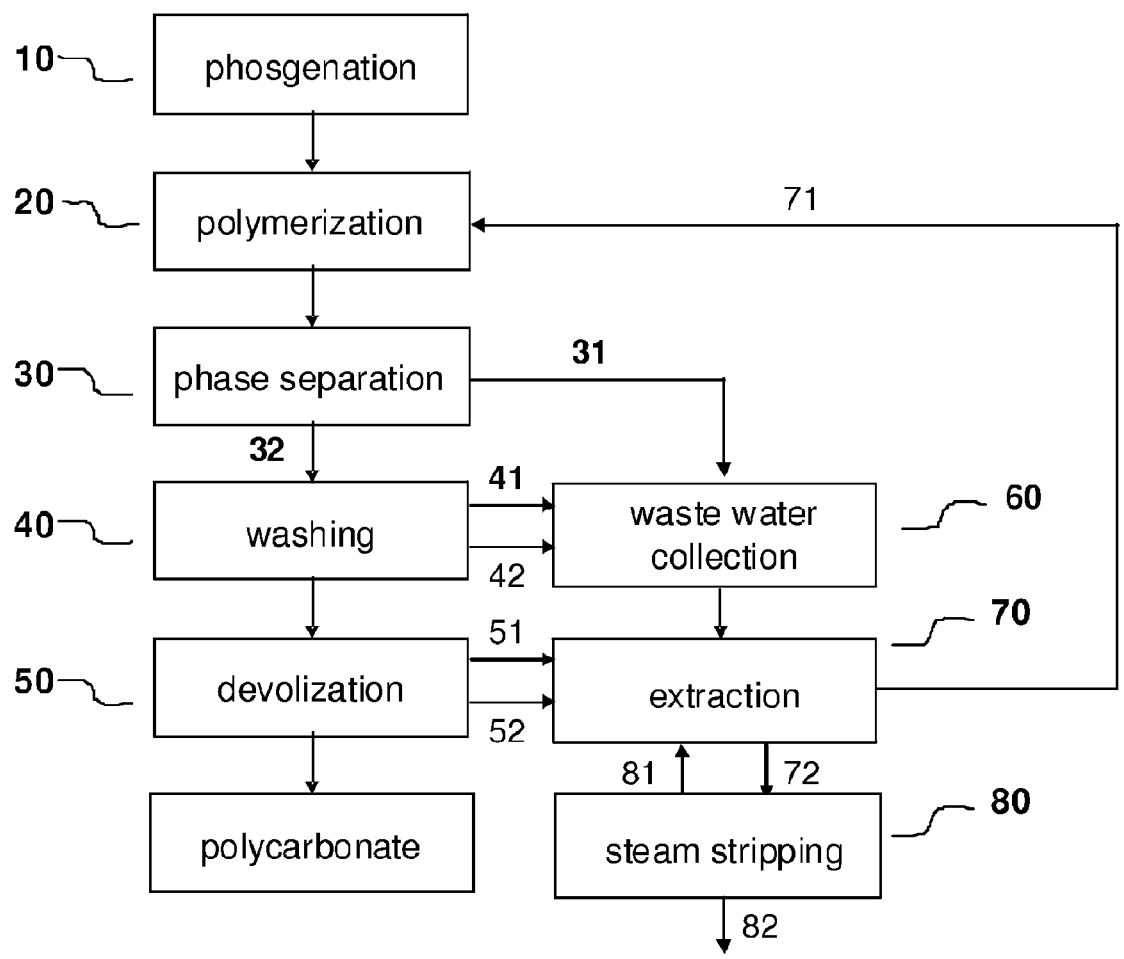
FIG. 1 illustrates a flow chart of a conventional method to recover the coupling catalyst in an interfacial process for producing polycarbonate resin.

FIG. 1 illustrates, in the form of a flowchart, a conventional interfacial polycarbonate manufacturing process in which the phosgenation reaction is conducted in step 10 followed by polymerization in step 20. In the phosgenation reaction 10, a carbonate precursor, preferably phosgene, dissolved in the water immiscible organic liquid is reacted with a salt of a dihydric phenol, commonly bisodium bisphenol A, to form carbonate oligomers having reactive chlorformate endgroups. The organic liquid is typically a chlorinated hydrocarbon such as dichloromethane although other organic liquids such as ethers, esters or ketones can be employed. The phosgene is normally employed in stoichiometric excess, typically 10 to 40 percent excess, in relation to the bisphenol. During phosgenation, the aqueous phase of the two phase reaction mixture is generally at an alkaline pH, preferably from 9 to 14, and contains a bisphenol material, commonly a bisphenolate salt such as a salt of bisphenol A, for example, sodium bisphenolate. The phenolate is dissolved in an amount from 10 to 25 weight percent based on the total weight of aqueous solution.

The aqueous phase will also typically contain a chain terminator such as a sodium salt of a monofunctional phenolic compound, for example, phenol or 4-tert-butylphenol, and optionally a branching agent such as the sodium salt of a multifunctional phenolic compound. The chain terminator and optional branching agent may be added before or coincident with the coupling catalyst.

During the phosgenation reaction, salts such as sodium chloride and sodium carbonate are formed and dissolve in the aqueous phase. The carbonate oligomers formed enter the organic phase.

Following the desired phosgenation, a coupling catalyst typically, an amine coupling catalyst for example a tertiary aliphatic amine such as triethylamine, tripropylamine, or tributylamine, is added to the reaction mixture. A cyclic tertiary amine, such as dimethyl pyridine, may also be used as the coupling catalyst. The reactive carbonate oligomers are polymerized in the presence of the coupling catalyst during polymerization step 20.

Referring once again to FIG. 1, following the desired completion of the phosgenation reaction, the aqueous phase and the organic phase are separated in step 30. Techniques that effectively separate the two phases are well known and can be employed in the practice of this invention. The specific conditions and techniques using for this separation are not critical to the practice of this invention and any of the described can be employed. The separation is normally and preferably conducted using centrifugation.

In the process depicted in FIG. 1, the separated aqueous phase 31 (for purposes of describing this process, this will be referred to as wastewater) is fed to a waste water collection step 60. The wastewater contains salts made during the phosgenation reaction, typically NaCl and $Na_2CO_3$ but also contains traces of the organic liquid, reaction medium as well as bisphenol and/or other phenolic compounds.

The specific materials in the separated aqueous phase and their amounts will depend on the raw materials and reaction conditions employed in the reaction. The phenolic compounds or components are typically bisphenol as well as carbonate oligomers and polymers. Other phenolic compounds may include phenol, para tertiary butylphenol, 1,1,1-tris(hydroxyphenyl)ethane and chlorinated, brominated, or methylated bisphenols. The separated aqueous phase will also be saturated with the organic, reaction, liquid and contain small amounts, for example, less than 0.1 weight percent, of the coupling catalyst. In addition, it may also contain small amounts of the phenolic terminator (for example, phenol), comonomers, if employed, and branching agents.

The separated organic phase 32 will contain the organic reaction solvent, polycarbonate resin as well as the coupling catalyst and bisphenolate salt, typically sodium bisphenolate. The coupling catalyst is generally in amounts of from 0.05 to 1 weight percent based on the total weight of the separated organic phase. The residual amounts of the bisphenolate salt (for example, sodium bisphenolate) are generally less than 0.1 weight percent.

The separated organic phase is washed in step 40. Techniques to wash the organic phase are well known in the art, not critical to the practice of this invention, and reference is made thereto for the purposes of this invention. Typically, the organic phase is washed with a dilute acid (for example, from 0.5 to 30 weight percent hydrochloric or phosphoric acid solution) to extract the amine coupling catalyst; followed by one to five wash steps with pure water. These water washes are generally performed in a sequence of conventional mixer-settler systems separators such as rotary mixers and liquid-liquid centrifuges or centrifugal extractors.

In the conventional method depicted in FIG. 1, the acidic wash water 41 and wash water(s) 42 are fed to the wastewater collection step 60. The water wash(es) 42 following washing, contain phenolic compound, the coupling catalyst and, typically, traces of organic liquid, water soluble polycarbonate oligomers and dispersed polycarbonate particles. In the extraction step 70, the aqueous mixture solution comprising the wastewater, and/or acidic wash water, and/or water wash(es) are treated with caustic or other suitable basic material to adjust the aqueous mixture solution to an alkaline aqueous mixture solution having a pH of 12 or higher and free the amine.

The extraction can be performed in extraction columns or centrifugal extractors. The extraction is advantageously conducted in a Podbielniak centrifugal extractor. Other equipment conventionally used for extraction purposes such as mixer-settler devices in which agitators, rotary pumps, shear valves or the like provide the mixing; and gravimetric settling, coalescers, hydrocyclones or liquid/liquid centrifuges may also be employed. The extraction is advantageously conducted in a liquid-liquid centrifuge. The extraction can be conducted in a single step or multi-step extraction. In general, this will depend on the level of phenolic components, water soluble oligomer(s), and dispersed polycarbonate particles in the aqueous liquid and the desired purification (that is, the desired purity of the treated water) with multi-step extraction being used when the aqueous liquid contains relatively larger concentrations of the phenolic components, water soluble oligomers, dispersed polycarbonate particles and/or a higher purity is required.

While extraction would normally be conducted in a countercurrent fashion with the aqueous liquid flowing counter to the flow of the organic, extraction, solution; cross flow or even cocurrent extraction is possible. Countercurrent extraction is preferred. Extraction is continued until the level of phenolic components, water soluble oligomers, dispersed polycarbonate particles in the aqueous liquid is desirably low. In general, extraction is continued until the of phenolic components, water soluble oligomers, dispersed polycarbonate particles are less than 100 parts per million (ppm), preferably less than 10 ppm, more preferably less than 1 ppm and most preferably less than 0.05 ppm.

In the extraction step 70, the phenolic materials, and any water soluble oligomers, and dispersed polycarbonate particles are removed from the wash water and wastewater by extraction with the organic liquid containing the amine coupling catalyst. Conveniently, for ease of further processing the organic liquid used to the treat the wash water and/or wastewater is the organic liquid used in the organic reaction phase 10 as well as the organic reaction phase 52 removed in the devolatization step 50. The organic liquid, coupling catalyst and extracted or removed phenolic materials are recycled 71 to the reaction mixture, such as shown in FIG. 1, polymerization step 20. It is desirable to recycle 71 directly back into 20 as amine coupling catalysts may react with chlorinated hydrocarbon solvents such as dichloromethane to form undesirable quaternary ammonium salts if the residence time in the recycle system and/or storage time is too long. The treated water, which contains organic liquid as well as traces of the coupling catalyst, is fed 72 to steam stripping step 80.

Steam stripping is a technique well known in the art and reference is made thereto for the purposes of this invention. It is conducted at conditions to remove the remaining organic liquid and coupling catalyst in the form of vapor from the aqueous liquid. Typically, the steam stripping operation is conducted by exposing the aqueous liquid to steam at a temperature of from 100 to 200° C. The organic liquid and coupling catalyst vaporized in the steam stripping operation are then condensed 81 and recycled from the treated wash and wastewater back to the extraction step 70. Alternatively, the removed organic liquid and coupling catalyst 81 can be recycled, in whole or in part, directly to the reaction mixture, preferably the polymerization reaction 20.

Following steam stripping, the aqueous phase 82, is disposed. Provided concentration of phenolic components, water soluble oligomers, dispersed polycarbonate particles is sufficiently small, the aqueous phase can be released to a salt containing environment such as the sea or brackish water or brine wells without further treatment. Alternatively, the aqueous liquid can be used in other operations such as chlor-alkali electrolysis.

Following washing, the polycarbonate is isolated from the organic phase in a recovery step 50 using techniques well known in the art such as devolitization (that is, steam evaporation of the solvent, or evaporation of the solvent in an extruder), or precipitation with a nonsolvent for the polycarbonate such as hexane or like means. Water 51 from step 50, which is generally saturated with the organic liquid reaction medium, is preferably fed back to different points of the process such as the wash section 40 or alternatively, the steam stripper 80 or, as depicted in the FIG. 1, the extraction step 70.

Figure 2:
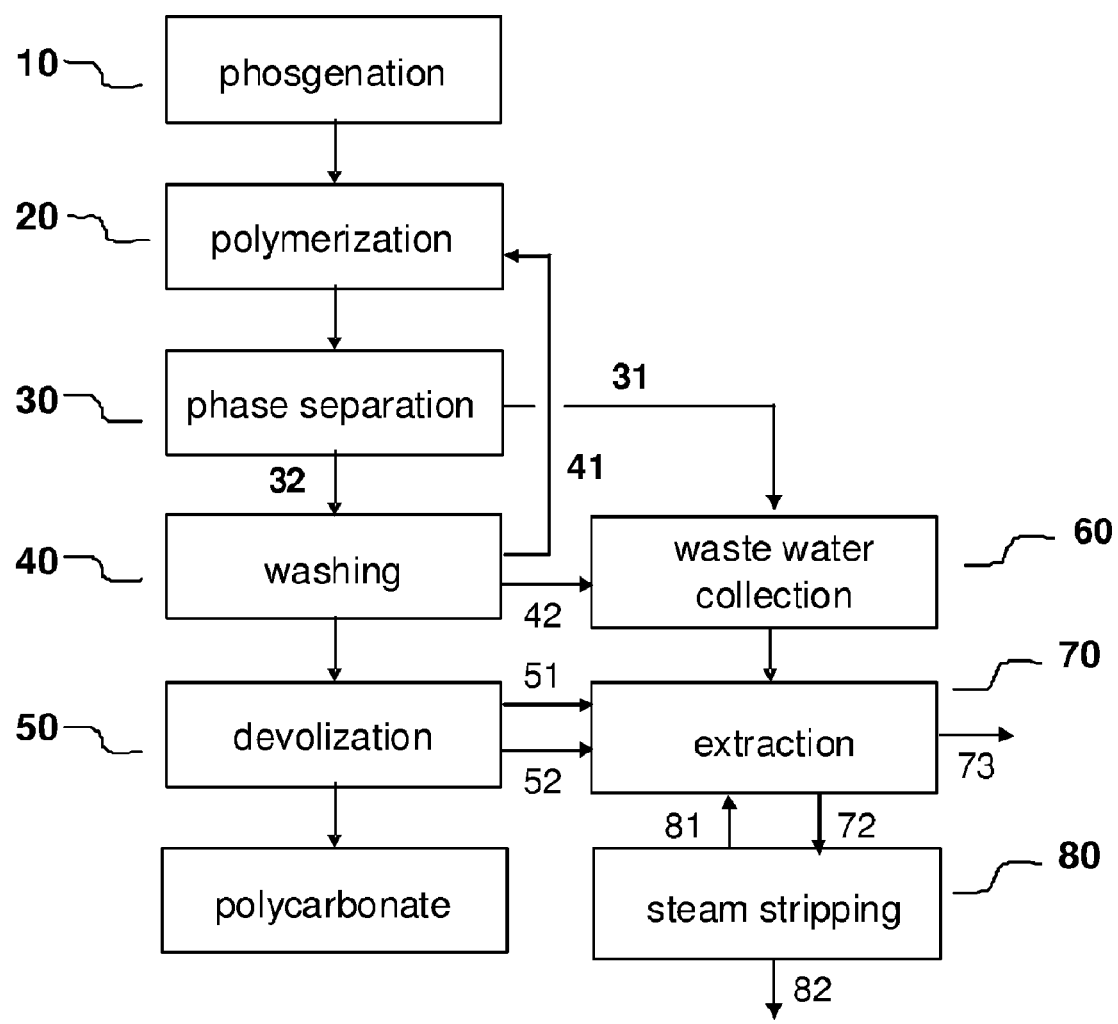
FIG. 2 illustrates a flow chart for one embodiment of the improved method of the present invention to recycle the coupling catalyst in an interfacial process for producing polycarbonate resin.

In the embodiment of the present invention illustrated in FIG. 2, the wastewater 31 and the wash water(s) 42 are treated the same as in the conventional method, i.e., waste water collection 60 then followed by extraction and/or distillation. While FIG. 1 depicts simultaneous treating of both the wash waters 41 and 42 and the wastewater 31, the present invention, as shown in FIG. 2, recycles the acidic aqueous wash 41 back into the polymerization step 20 thus, eliminating neutralization, extraction, distillation, and isolation steps for the solution containing the coupling catalyst. The organic liquid 73 is preferably fed back to different points of the process, such as the polymerization step 20, or alternatively, it can be subjected to a steam stripper step of its own.

In an alternative embodiment of the present invention, the acidic wash water 41 containing the amine coupling catalyst, which is in the form of a hydrochloride, is not mixed with the other waste water streams but is treated with caustic or other suitable basic material to adjust its pH to 12 or higher and free the amine. This mixture can then be fed directly to the polymerization step 20. In other words, treating the acidic wash water solution comprising the salt of the coupling catalyst with a basic material to adjust the solution pH to at least 12, producing an alkaline wash water solution comprising the coupling catalyst, then recycling said alkaline wash water solution comprising the coupling catalyst back into the polymerization step 20.

With regard to the various steps shown in the embodiment of the present invention FIG. 2, phosgenation and polymerization can be conducted by conventional techniques well known in the art. For example, these techniques, including the process conditions and raw materials, are generally exemplified in Ullmann's Encyclopedia of Industrial Chemistry, 5th, Completely Revised Edition, Volume 21A: Plastics, Properties and Testing to Polyvinyl Compounds, pages 210 and 211. The specific conditions and techniques used in the oligomerization and polymerization of the interfacial, polycarbonate production method are not critical to the practice of this invention and essentially any of the interfacial, polycarbonate, polycondensation techniques exemplified in the cited references can be employed.

The polycarbonate production (both phosgenation and polymerization) can be carried out in a batchwise or continuous fashion. Batchwise production is conducted in a stirred tank whereas the more preferred continuous technique typically makes use of a series of stirred tanks or one or more tubular reactors. In general, phosgenation and polymerization are conducted in the same reactor vessel or without any intermediate purification or other steps between the phosgenation or polymerization reaction.

The dihydric phenols employed in the practice of the present invention are generally known in the carbonate polymerization art and in which the only reactive groups under condensation polymerization conditions are the two phenolic hydroxyl groups. Useful dihydric phenols are for example those of the general formula HO—Z—OH, wherein Z comprises a mono- or poly-aromatic diradical of 6-30 carbon atoms, to which the phenolic oxygen atoms are directly linked. The aromatic group(s) may comprise one or more heteroatoms and may be substituted with one or more groups, for example one or more oxygen, nitrogen, sulfur, phosphorous and/or halogen, one or more monovalent hydrocarbon radical, such as one or more alkyl, cycloalkyl or aryl groups and/or one or more alkoxy and/or aryloxy groups. Preferably, both phenolic hydroxy groups in the dihydric phenol HO—Z—OH are arranged in para-positions on the aromatic ring(s). The dihydric phenols employed in the process of the present invention include the bis(aryl-hydroxy-phenyl)alkylidenes including their aromatically and aliphatically substituted derivatives, such as disclosed in U.S. Pat. Nos. 2,999,835; 3,038,365; 3,334,154 and 4,299,928; and aromatic diols such as described in U.S. Pat. No. 3,169,121.

Preferred examples of dihydric phenols of the general formula HO—Z—OH are bis(hydroxyphenyl)fluorenes, such as 9,9-bis-(4-hydroxyphenyl) fluorene; dihydroxy benzenes and the halo- and alkyl-substituted dihydroxy benzenes, such as hydroquinone, resorcinol, or 1,4-dihydroxy-2-chlorobenzene; alpha,alpha'-bis(hydroxyphenyl)-diisopropylbenzenes; dihydroxybiphenylenes, such as 4,4'-dihydroxydiphenyl; the halo- and alkyl substituted dihydroxybiphenylenes; bis(hydroxyphenyl)alkanes, such as bis(4-hydroxylphenyl)methane, 1,1-bis(4-hydroxyphenyl)ethane, 1,1-bis(4-hydroxyphenyl)propane, or, most preferably, 2,2-bis(4-hydroxyphenyl)propane ("bisphenol A"); alkyl-, aryl- or halosubstituted bis(hydroxyphenyl)alkanes, such as 1-phenyl-1,1-bis(4-hydroxyphenyl)ethane ("bisphenol AP"), 2,2-bis(3,5-dibromo-4-hydroxyphenyl)propane ("tetrabromo bisphenol A"), 2,2-bis(3,5-dimethyl-4-hydroxyphenyl)propane ("tetramethyl bisphenol A"); optionally alkyl-, aryl- or halosubstituted bis(hydroxyphenyl)cycloalkanes; optionally alkyl-, aryl- or halosubstituted bis(hydroxyphenyl)ethers; optionally alkyl-, aryl- or halosubstituted bis(hydroxyaryl)sulfones, preferably bis(hydroxyphenyl)sulfones; or bis(hydroxyphenyl)sulfoxides. Other examples of suitable dihydric phenols are listed in U.S. Pat. No. 4,627,949, column 2, line 68-column 3, lines 1-22, in U.S. Pat. No. 4,962,144, column 2, lines 17-46 and in EP 423 562, page 2, lines 24-55 and page 3, lines 1-19. Mixtures of two or more dihydric phenols may also be used, for example a mixture comprising 1-99 percent of bisphenol A and 99-1 weight percent of another dihydric phenol, such as 9,9-bis-(4-hydroxyphenyl)fluorene.

Among the most preferred dihydric phenol suitable for production of polycarbonate in the present invention are bisphenol A, bisphenol A P, tetrabromo bisphenol A, and tetramethyl bisphenol A. The most preferred dihydric phenol is bisphenol A.

A carbonate precursor suitable for use in the present invention contains leaving groups which can be displaced from the carbonyl carbon in attack by the anion of a dihydric phenol compound, and includes but is not necessarily limited to carbonyl halides or acyl halides, of which, the most preferred is phosgene. The carbonate precursor, preferably phosgene, is contacted with the dihydric phenol compound in the aqueous alkaline solution and can be added as a solution in the water-immiscible non-reactive organic solvent and thoroughly mixed with the aqueous phase or can be bubbled into the reaction mixture in the form of a gas and preferentially dissolve and locate in the organic phase. The carbonate precursor is typically used in an amount of 1.0 to 1.8, preferably 1.2. to 1.5, moles per mole of dihydric phenol compound.

A chain terminator is a monofunctional compound containing a functional group, frequently a hydroxyl group, which will produce an anion capable of displacing an unreacted hydroxyl or carbonic acid ester group which remains on the end of the oligomer or polymer chain. Representative of the terminators which are useful for the production of polycarbonates in the present invention are phenol and the derivatives thereof, saturated aliphatic alcohols, metallic sulfites, alkyl acid chlorides, trialkyl- or triarylsilanols, monohalosilanes, amino alcohols, trialkyl alcohols, aniline and methylaniline. Of these, phenol, para-t-butyl phenol (PTBP), p-cumyl phenol and para-t-octyl phenol (4-(1,1,2,2-tetramethylbutyl)-phenol or PTOP) are the most preferred for use in the present invention.

Branching agents (typically phenols having three or more hydroxy or condensation reactive groups) can be employed to obtain branched polycarbonates with the desired molecular weight and branching degrees. Suitable branching agents are generally one or more of the following: phloroglucin; phloroglucid; 2,6-dimethyl-2,4,6-tri(4-hydroxyphenyl)heptene-3; 4,6-dimethyl-2,4,6-tri(4-hydroxyphenyl)heptene-2; 4,6-dimethyl-2,4,6-tri(4-hydroxyphenyl)pentene-2; 4,6-dimethyl-2,4,6-tri(4-hydroxyphenyl)pentane; 1,3,5-tri(4-hydroxyphenyl)benzene; 1,3,5-tri(2-hydroxyphenyl)benzol; 1,1,1-tri(4-hydroxyphenyl)ethane; 2,6-bis(2-hydroxy-5-methylbenzyl)-4-methylphenol; tetra(4-hydroxy-phenyl)methane; trisphenol; bis(2,4-dihydroxyphenyl)ketone; 1,4-bis(4,4-dihydroxytriphenylmethyl)benzene; α,α',α"-tri(4-hydroxyphenyl)-1,3,5-tri-isopropylbenzene; 3,3-bis(4-hydroxyaryl)oxyindole; isatinbisphenol; 5-chloroisatin; 5,7-dichloroisatin; 5-bromoisatin; trimellitic acid; pyromellitic acid; benzophenonetetra-carboxylic acid; and including for the appropriate compounds, the acid chlorides or other condensation reactive derivatives thereof such as trimellitic trichloride, trimesoylchloride and trimellitic anhydride chloride. Specifically preferred branching agents include phloroglucin; phloroglucid; 1,1,1-tri(4-hydroxyphenyl)ethane; trimellitic acid; trimellitic trichloride; pyromellitic acid; benzophenonetetracarboxylic acid and acid chlorides thereof; 2,6-bis(2-hydroxy-5-methylbenzyl)-4-methylphenol and 1,3,5-tri(4-hydroxyphenyl)benzene.

It has been found that levels of branching agent in the branched carbonate polymer components for use in the present invention should be in the range of from about 0.005 to about 1 mole branching agent per mole of dihydroxy compound, preferably from about 0.01 to about 0.8, and more preferably from about 0.1 to about 0.6.

Suitable coupling catalysts include a tertiary amine such as triethylamine (TEA), dimethyl amino pyridine or N,N-dimethyl aniline; a cyclic aza compound such as 2,2,6,6-tetramethyl piperidine or 1,2-dimethylimidazole; an iminoether or iminocarboxylate compound such as 1-aza-2-methoxy-1-cycloheptene or t-butyl-cyclohexyliminoacetate; or a phosphonium, sulfonium, arsonium or quaternary ammonium compound such as cetyl triethylammonium bromide. Tertiary amines are the preferred coupling catalysts for use in improved process according to the present invention and include trimethylamine, triethylamine, tributylamine, and 4-N,N-dimethylaminopyridine.

In this process, the coupling catalyst is generally used in amounts typically ranging from about 0.001 to about 0.1 moles per mole of dihydric phenol compound. The catalyst is preferably added in amounts of at least about 0.0025, preferably at least about 0.008 and more preferably at least about 0.015 moles per mole of dihydric phenol compound. The catalyst is preferably added in amounts up to about 0.15, preferably up to about 0.1 and more preferably up to about 0.075 moles per mole of dihydric phenol compound. Some or all of the catalyst is added at the beginning of the polymerization process. Optionally, the coupling catalyst addition is split with a second part added later in the polymerization process.

EXAMPLES

The inventive step in the interfacial polycarbonate manufacturing process of the present invention is demonstrated by Examples 1 to 4, and Comparative Examples A and B. In the following examples, bisphenol-A, caustic, water, phosgene, dichloromethane, and a phenolic chain terminator are reacted in a conventional commercial interfacial polycarbonate manufacturing process. A sample of the biphasic reaction mixture is removed from the stirred reactor after all the components are combined. The aqueous and organic phases are allowed to separate. The organic phase comprises 14 weight percent carbonate oligomers having a chloroformate content of about 10 weight percent. The aqueous phase has a pH of about 13. For each example of the invention, Examples 1 to 4, and for the Comparative Examples A and B, 75 milliliter (ml) of each phase is placed in a 250 ml stirred reaction flask resulting in a total of 150 ml reaction mixture. Examples 1 and 3 and Comparative Example A are carried out with a stiffing speed of 350 rotations per minute (RPM) and Examples 2 and 4 and Comparative Example B are carried out with a stirring speed of 500 RPM. After stirring is initiated, a coupling catalyst solution is added to each reaction flask.

The coupling catalyst solution for Comparative Examples A and B is a 10 weight percent solution of triethyl amine in dichloromethane and represents how coupling catalyst is added in conventional interfacial polycarbonate manufacturing processes. 2.5 ml of the percent triethyl amine in dichloromethane is added, resulting in a triethyl amine concentration of about 3300 ppm with respect to the complete organic phase.

The coupling catalyst solution for Examples 1 and 2 is representative of the acidic wash water 41. It is a 4.6 weight percent aqueous solution of triethyl amine hydrochloride having a pH of 0.3. 7 ml of the acidic triethyl amine hydrochloride solution is added, resulting in a triethyl amine concentration of about 3300 ppm with respect to the organic phase.

The coupling catalyst for Examples 3 and 4 is representative of an acidic wash water 41 which has been neutralized. It is derived from the neutralization of an aqueous solution of triethyl amine hydrochloride containing 4.6 weight percent of triethyl amine having a pH of 0.3 by the addition of 30 weight percent caustic giving an aqueous solution with a pH 8.3. 7 ml of the neutralized acidic triethyl amine hydrochloride solution is added, resulting in a triethyl amine concentration of about 3300 ppm with respect to the organic phase.

Starting from when the coupling catalyst solution is added to the stirred reaction mixture, a sample of the reaction mixture is removed at one minute intervals and tested for chloroformate to determine the extent of polymerization.

The amount of chloroformates is determined by the following method: Chloroformates treated with 4-(4-nitrobenzyl)pyridine reacts to yield an intensive yellow-orange colored complex. The colored complex is analytically detected spectroscopically at a wave length of 438 nanometers (nm). To a 20 ml sample of the organic phase for each example, having a known content of carbonate ester oligomers and/or polymers, is added 2 ml dichloromethane, containing 1 weight percent 4-(4-nitrobenzyl)pyridine, then shaken well for 5 minutes. After that the solution is filled into a quartz cuvette (10-50 millimeter (mm)). The light absorption at 438 nm is measured against a blank without polymer or oligomer. The coefficient of extinction is determined by standards, prepared with phenyl chloroformate.

After the coupling reaction is complete, the organic and aqueous phases are separated, the organic phase is washed, and the polycarbonate resin isolated by evaporation of the dichloromethane. The molecular weight for the resulting polycarbonate resins is determined.

The chloroformate concentration versus time and the resultant polycarbonate molecular weights for Examples 1 to 4 and Comparative Examples A and B are summarized in Table 1. In Table i:
  "TEA" is triethylamine;
  "CH$_2$Cl$_2$" is dichloromethane;
  "Chloroformate Concentration" is related to the oligomer/polymer;
  "Mn" and "Mw", are number average and weight average molecular weight, respectfully, and are determined by gel permeation chromatography (GPC) using a diode-array-detector (DAD) and a viscosity-detector.

TABLE 1

| Comparative Example | A | B | | | | |
|---|---|---|---|---|---|---|
| Example | | | 1 | 2 | 3 | 4 |
| Catalyst | | | | | | |
| TEA/MeCl$_2$ | X | X | | | | |
| TEA/Acidic, pH 0.3 | | | X | X | | |
| TEA/Neutralized. pH 8.3 | | | | | X | X |
| Stirring | | | | | | |
| 350, RPM | X | | X | | X | |
| 500, RPM | | X | | X | | X |
| Chloroformate Concentration, ppm | | | | | | |
| 0, sec | 11,000 | 11,000 | 11,000 | 11,000 | 11,000 | 11,000 |
| 60, sec | 0.8 | 0.3 | 9.3 | 0.6 | 0.6 | 0.1 |
| 120, sec | <0.1 | <0.1 | 0.4 | <0.1 | <0.1 | <0.1 |
| 180, sec | <0.1 | <0.1 | <0.1 | <0.1 | <0.1 | <0.1 |
| Molecular Weight | | | | | | |
| Mn, g/mole | | | 7,910 | | 8,440 | 8,330 |
| Mw, g/mole | | | 18,100 | | 18,900 | 18,300 |

As can be seen by the data, complete coupling for the examples of the present invention (as well as the comparative examples) is achieved within two to three minutes providing polycarbonate resins with as good or better molecular weights as compared to the comparative examples.

The invention claimed is:

1. An interfacial process for producing a polycarbonate resin from a dihydric phenol, a carbonate precursor, and a monophenolic chain terminator using an amine coupling catalyst which process comprises the steps of:
    (a) reacting the carbonate precursor and the dihydric phenol using a two-phase reaction mixture to form carbonate oligomers; the reaction mixture comprising an aqueous, alkaline phase and an immiscible organic phase, with the carbonate precursor being dissolved in an organic phase and a salt of the dihydric phenol and a salt of the monophenolic chain terminator dissolved in the aqueous phase;
    (b) subsequently polymerizing the carbonate oligomers in the presence of a coupling catalyst to form a polycarbonate resin;
    (c) separating the aqueous and organic phases; wherein the organic phase comprises the coupling catalyst and polycarbonate resin;
    (d) treating the separated organic phase with an acidic wash water solution to remove amine coupling agent by forming a salt of the coupling catalyst which is soluble in the acidic wash water solution;
    (e) recovering the polycarbonate resin;
    wherein the improvement comprises
    (i) treating the acidic wash water solution comprising the salt of the coupling catalyst with a basic material to adjust the solution pH to at least 12 producing an alkaline wash water solution comprising the coupling catalyst; and
    (ii) recycling said alkaline wash water solution comprising the coupling catalyst back into the polymerization step (b).

2. The process according to claim 1 wherein the amine coupling catalyst is a tertiary amine.

3. The process of claim 2 wherein the amine coupling catalyst is triethylamine.

4. The process of claim 1 wherein the dihydric phenol is bisphenol-A; the carbonate precursor is phosgene; the monophenolic chain terminator is phenol, para-t-butyl phenol, p-cumyl phenol, or para-t-octyl phenol; and the amine coupling catalyst is triethyl amine.

5. The process of claim 1 further comprising a branching agent providing a branched polycarbonate resin.

6. The process of claim 1 wherein the basic material is a caustic solution.

7. A polycarbonate resin produced by the process of claim 1 or 6.

8. A branched polycarbonate resin produced by the process of claim 5.

* * * * *